(12) United States Patent
Grover

(10) Patent No.: US 6,193,125 B1
(45) Date of Patent: Feb. 27, 2001

(54) LOCKING TOOL HOLDER

(76) Inventor: Ralph Ernest Grover, 2686 Elden Ave., Costa Mesa, CA (US) 92627

( * ) Notice: Subject to any disclaimer, the term of this patent is extended or adjusted under 35 U.S.C. 154(b) by 0 days.

(21) Appl. No.: 09/483,271

(22) Filed: Jan. 13, 2000

(51) Int. Cl.$^7$ .................................................. A45C 15/00
(52) U.S. Cl. ......................... 224/575; 224/195; 224/666; 224/673; 224/678; 224/230; 224/241; 224/242; 224/904; 224/930
(58) Field of Search .................................... 224/575, 182, 224/194, 195, 666, 673, 678, 230, 235, 241, 242, 244, 269, 904, 930

(56) References Cited

U.S. PATENT DOCUMENTS

| | | |
|---|---|---|
| 984,402 | 2/1911 | Tuttle . |
| 3,168,971 * | 2/1965 | Goertzen ............................. 224/673 |
| 3,450,317 | 6/1969 | Ramer . |
| 3,828,990 * | 8/1974 | Baldocchi ........................ 224/912 X |
| 4,113,156 * | 9/1978 | Brito ................................ 224/195 X |
| 4,123,029 | 10/1978 | Gillotti . |
| 4,372,468 | 2/1983 | Harvey . |
| 4,609,326 | 9/1986 | Roesler . |
| 4,677,362 * | 6/1987 | House, II et al. ............... 224/195 X |
| 4,896,806 * | 1/1990 | Sanchez, Jr. ......................... 224/242 |
| 4,917,281 * | 4/1990 | Ostermiller .......................... 224/661 |
| 4,951,857 * | 8/1990 | Carr .................................... 224/230 |
| 4,974,764 * | 12/1990 | Cantwell ............................. 224/269 |
| 5,195,667 | 3/1993 | Gallant . |
| 5,452,830 | 9/1995 | Hopkins et al. . |
| 5,573,167 | 11/1996 | Bebb et al. . |
| 5,611,471 * | 3/1997 | French ................................ 224/243 |
| 5,820,333 | 10/1998 | Hong . |
| 5,857,600 * | 1/1999 | Akutsu ................................ 224/240 |
| 5,890,638 * | 4/1999 | Woloshen ............................ 224/247 |
| 5,944,242 | 8/1999 | Musarella et al. . |
| 6,102,264 * | 8/2000 | Redzisz ............................... 224/197 |

* cited by examiner

Primary Examiner—Stephen K. Cronin
(74) Attorney, Agent, or Firm—Gene Scott-Patent Law & Venture Group

(57) ABSTRACT

An apparatus comprises a base plate having features enabling mounting on a person's belt or pocket. A cradling device is adapted for receiving a hand tool and for clamping the hand tool. A biasing device is adapted for moving the tool clamping device between a tool receiving position and a tool clamping position so as to make the tool available for use and to place the tool within reach when it is needed respectively. When the tool is removed from the clamping device the it is automatically unclamped. When the tool is placed into the clamping device it is automatically clamped in place.

7 Claims, 3 Drawing Sheets

LOCKING TOOL HOLDER

BACKGROUND OF THE INVENTION

1. Field of the Invention

This invention relates generally to tool holders, and more particularly to an automatically-locking tool holder with a release.

2. Description of Related Art

The following art defines the present state of this field:

Gallant, et. al. U.S. Pat. No. 5,195,667 describes a device for suspending T-shaped tools from a belt, toolbox, wall, or other mount, comprising a flat attachment material and a rotating holder body which secures the tool while allowing the tool to be inserted and removed from different angles. In order to ensure that the holder body stays in a useful position, its swing is limited by two stops which act as brakes and are affixed so as to protrude perpendicularly from the attachment material. The invention is designed so that after the tool is inserted into the holder, the head of the tool remains secured by the cantilevering action of a spring-loaded clip against a dead-lock arm extending downwards from the holder body. The opposite end of the tool rests on an L-shaped extending at right angles from the attachment material. The tool is removed by the natural motion of grasping the handle and swinging upwards. This results in the tool being held in an immediately usable manner as it is withdrawn from the holder.

Gillotti, et al. U.S. Pat. No. 4,123,029 describes a stand for holding a book in an open, upright position on a horizontal surface, consisting of a face place, held at a rearwardly inclined position by a rear mounted triangular support plate, and a book resting shelf located on the lower front side of the face plate. The book is held in an open position by two page gripping asssemblies at the book resting shelf level, including two page gripping brackets, connected to spring loaded rods, which grip the open book pages from below, holding the open pages against the face plate. The gripping assembly tension is adjusted by wing nuts at the ends of both rods.

Musarella, et al. U.S. Pat. No. 5,944,242 describes a tool holder for mounting on a user belt comprising a support member having two front supports and two rear supports, each rear support having a rear top portion, a rear bottom portion, and a rear transition portion positioned therebetween. Each front support is spaced from and biased substantially parallel to the rear top portion and being nonparallel to the rear bottom portion. Each rear transition portion extends toward the front support to provide a narrow gap which is smaller than the spacing between the front support and rear top portion, with the rear supports being connected by a support cross member, and the rear bottom portions extending away from the front supports. Also, the rear bottom portions are of substantially the same length as the rear top portions. A bracket member is operatively associated with the front supports for holding a tool. Thus, when the tool holder is mounted on a user belt, the front supports and rear transitions portions resistance to removal of the support member from the belt.

Harvey et al. U.S. Pat. No. 4,372,468 describes a snap-lock device for securing and pivotally supporting a hammer or other similar tool from the user's waist belt. The device is comprised of a pad support which is suspended from the waist belt, an open ended tool support which is pivotally mounted on the pad for carrying the tool, and a pair of spring biased tool retention gates which are mounted on the open ends of the tool support loop for rapid lateral entry of the tool into the tool support loop and securing of the tool.

Hopkins et. al. U.S. Pat. No. 5,452,830 describes a holder for implements such as a mortal board, which are to be horizontally positioned, knives, such as broad, spackle, and shear knives, which are to be positioned at an angle, and a roll of drywall tape, vertically positioned. Holder comprises a back plate to secure implements, and a second plate in which the implement holder is temporarily attached to the user, more specifically, the waist area of the user. The mortar board is inserted into the Y-shaped slots which are horizontally aligned to the back plate and are disposed in spaced relationship. The knives are inserted into the compression loaded slots having adjacent relationship and positioned at an angle from the back plate. The tape is inserted into the J-shaped hook which is spaced away from the back plate to allow for the tapes positioning and removal to and from the implement holder. The parts which comprise the implement holder are made from a rigid material, preferably aluminum. When the implements are engaged in their appropriate locations within the implement holder, both hands of the worker are free to conduct other operations.

Ramer et. al. U.S. Pat. No. 3,450,317 describes a tool holder for headed tools to be carried on the belt of a person. The holder consists of a plastic member having a portion for suspending from the belt, and including a bifurcated, semi-circular portion extending from the belt holding portion. A two part locking member has one portion in the form of a square-shaped tab, which is secured at one end to the plastic member at the juncture of the belt portion and the bifurcated portion. The other end of the tab member has secured thereto to a second semicircular member, forming the other part of the locking member, the second semi-circular member being movable with the tab portion. The second semi-circular member receives the head of a tool and rotates along the plastic member, with the tab, allowing the handle of the tool to extend between the bifurcated portion with the second semi-circular member wrapping over the head of the tool, securely locking the tool in the holder.

Bebb et. al. U.S. Pat. No. 5,573,167 describes a method for using a holder having first and second clips arranged with their mouths facing substantially the same direction. The first clip is provided with an inner surface which is shaped to hold a cylindrical article and a mouth which is normally open so as to allow the legs of this first clip to be urged apart from each other when such a cylindrical article is pressed against it. The holder is mounted at a designated location on the user's body by attaching the second clip to a piece of material worn by the user, with the mouth of the first clip facing generally downwardly. A substantially cylindrical article is inserted into the first clip by placing the article against the mouth of this clip and lifting the article upwardly into contact with its inner surface, with the axis of the first clip's inner surface in a generally horizontal orientation. Preferably, the insertion of the article is performed by balancing it in one of the user's hands, placing the thumb of that hand on an upwardly facing surface of the holder and lifting the article into the first clip by pulling the article and thumb toward each other.

Tuttle, et. al. U.S. Pat. No. 984,402 describes a carrying device comprising a frame having portions formed to provide garment-engaging spurs, a follower supported by the frame, and a stop supported by the frame and having portions engaged with the said garment-engaging spurs.

Hong, et. al. U.S. Pat. No. 5,820,333 describes a twin gripping apparatus for loading components comprised of two grippers, each composed of two pairs of fingers, disposed at an angle of predetermined value so that the components are held and carried to and from a work station. The two pairs of fingers perform simultaneously a carrying motion to and from a work station by gripping the components positioned at each work station by means of hydraulic pressure from air cylinders, and rotating to and from an angle of predetermined value.

Hopkins, et. al. U.S. Pat. No. 5,452,830 describes a holder for implements such as a mortal board, which is to be horizontally positioned, knives, such as broad, spackle, and shear knives, which are to be positioned at an angle, and a roll of drywall tape, vertically positioned. Holder comprises a back plate to secure implements, and a second plate in which the implement holder is temporarily attached to the user, more specifically, the waist area of the user. The mortar board is inserted into the Y-shaped slots which are horizontally aligned to the back plate and are disposed in spaced relationship. The knives are inserted into the compression loaded slots having adjacent relationship and positioned at an angle from the back plate. The tape is inserted into the J-shaped hook which is spaced away from the back plate to allow for the tapes positioning and removal to and from the implement holder. The parts which comprise the implement holder are made from a rigid material, preferably aluminum. When the implements are engaged in their appropriate locations within the implement holder, both hands of the worker are free to conduct other operations.

Roesler et. al. U.S. Pat. No. 4,609,326 describes a gripping arrangement, particularly for manipulators, tool exchange devices and the like, has a housing, a guide provided in the housing, and two gripping fingers having gripping ends and moveable along the guide of the housing in a translatory reciprocating movement between a gripping position in which the gripping ends receive and hold an object therebetween and the gripping ends extend outwardly beyond the housing, and a releasing position in which the gripping ends release the object and gripping fingers are withdrawn substantially completely into and without projecting beyond the housing, the guide includes arcuate guiding tracks and guiding elements guided in and along the latter so that the movement of the gripping fingers includes a rectilinear component extending in a direction toward the object to be gripped and a transverse component extending transverse to the first component and in a direction toward the object to be gripped, whereby each of the gripping fingers during its movement from the releasing position toward the gripping position performs a rectilinear movement in a direction toward the object on which the transverse component directed toward the object is superposed, the gripping fingers have an axis therebetween and the arcuate guiding tracks are arranged symmetrically relative to the axis, and the gripping ends of the gripping fingers have inner sides and are provided at the inner sides with gripping surfaces which face toward the object in the gripping position and each has a portion embracing the object before its diametrical plane and a portion embracing the object after its diametrical plane.

The prior art teaches various holding and gripping mechanisms, some of which have a locking component. Several of the locking mechanisms, however, apply to headed or T-shaped tools only such as hammers (Ramer, Gallant, Harvey). Other gripping mechanisms require that manipulators and tool exchange devices and the like be inserted or positioned horizontally (Roesler, Hopkins, Bebb), so that they are unpractical for carrying a hand drill, which needs to be inserted and suspended vertically. Other holding mechanisms are not intended to hold tools (Gillotti (books); Tuttle (mail)). The prior art does not teach an apparatus that will allow a tool without a head (such as cylindrical hand drill) to be inserted laterally with a movement that will also lock it into place, and including both a guard plate and a means by which the cradled tool pivots freely with respect to the base plate so that the tool always stays in the desired vertical orientation. No added motions are required to lock or unlock the tool in place other than the usual motions of placing the tool into a cradle and later removing it.

The present invention fulfills these needs and provides further related advantages as described in the following summary.

SUMMARY OF THE INVENTION

The present invention teaches certain benefits in construction and use which give rise to the objectives described below.

The present invention provides an apparatus comprising a base plate having a base for mounting; a cradling device adapted for receiving a hand tool; a tool clamping device; and a biasing device adapted for moving the tool clamping device from a tool receiving position to a tool clamping position, and for moving the tool clamping device from the tool clamping position to the tool receiving position, the tool clamping device providing an actuating finger positioned for moving the clamping device from the tool clamping position to the tool receiving position when the tool is lifted from the cradle.

A primary objective of the present invention is to provide a tool holding and locking apparatus having advantages not taught by the prior art.

Another objective is to provide a means of inserting a tool easily into a holder with a downward, vertical motion.

A further objective is to provide a means of automatically locking the tool into the holder with the same motion used to insert it.

A further objective is to provide a means of automatically unlocking the tool with the same motion used to remove it.

Another objective is to provide a means of carrying the locking tool holder easily on a belt or item of clothing.

A further objective is to provide a means of releasing the tool with one upward movement.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
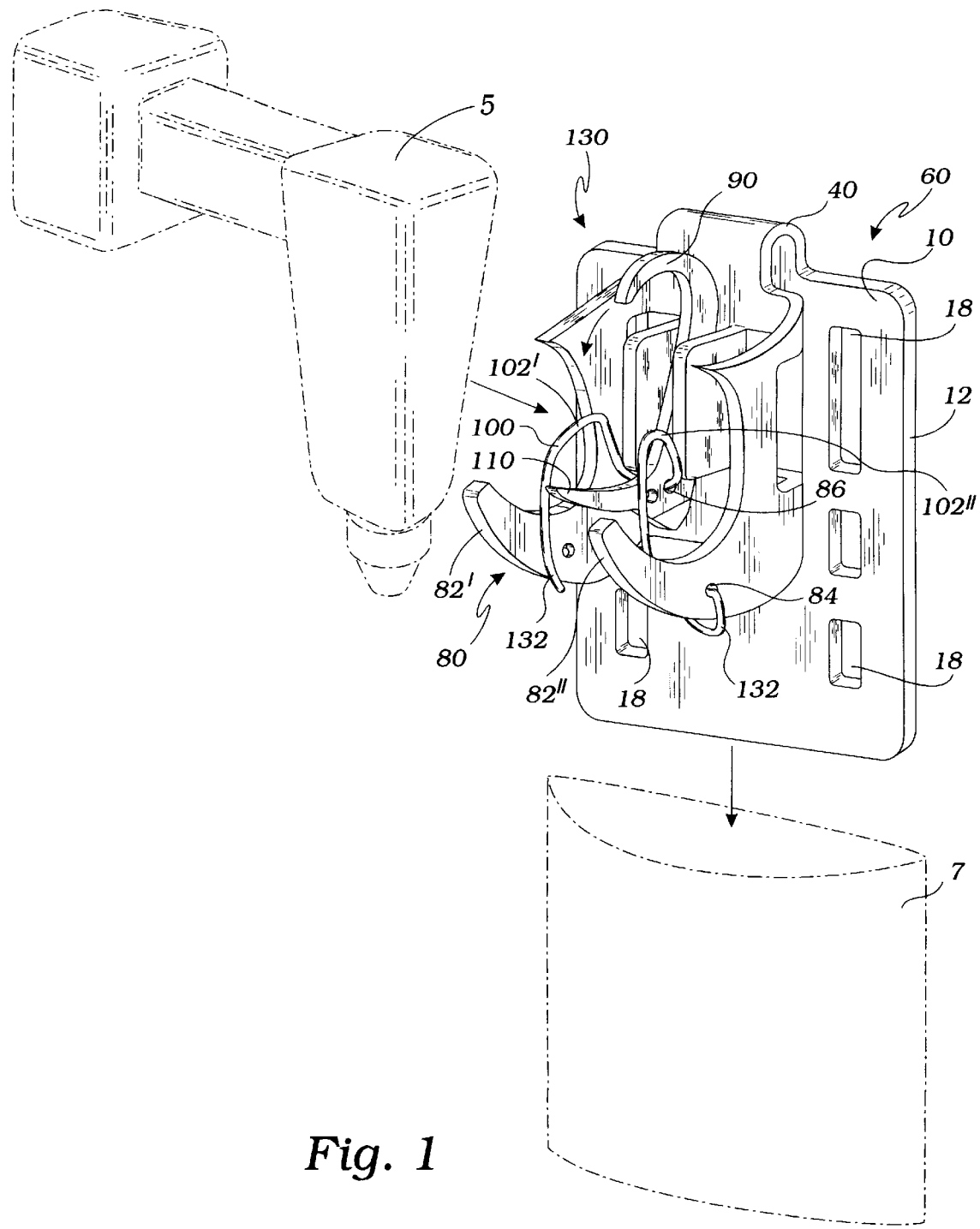
FIG. 1 is a perspective view of the preferred embodiment of the present invention showing a clamping means in a tool receiving ready position.

The above described drawing figures illustrate the invention, an apparatus comprised of a base plate 10, inventively comprised of a hard plastic sheet stock, and providing for several different means for mounting. The first is a pattern of six elongated holes 18—three near an edge 12 in spaced apart juxtaposition, through which belts (not shown) of different widths may be alternately threaded. Inventively, a second means for mounting is the shape of the base plate 10, which is similar to that of a pocket 7 in a work garment. The base plate 10 may therefore be easily carried or mounted in a pocket (not shown). A third means for mounting is the curved aspect of the base plate 10, which, in one embodiment, forms a reversal bend 40, forming a clip 60. The clip 60 allows the apparatus to be carried or mounted on a belt around the waist or tucked into a pocket or other clothing crevice. The flexible nature of the plastic sheet stock of which the base plate 10 is comprised, allows the -clip 60 to pinch for holding any material placed therein. This spring-like mechanism allows objects to be held more firmly between the base plate 10 and a cradling means 80.

Figure 2:
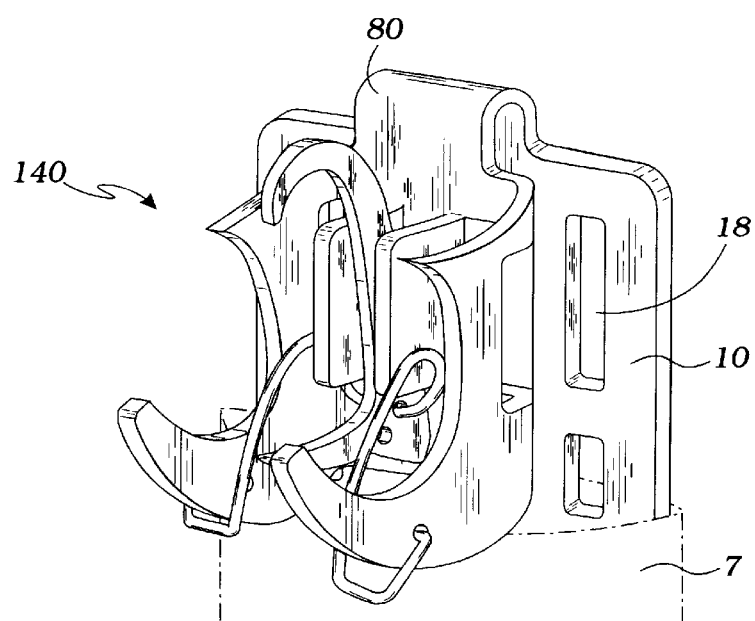
FIG. 2 is a perspective view thereof with the clamping means in a tool received position as supported in a pocket.
Figure 3:
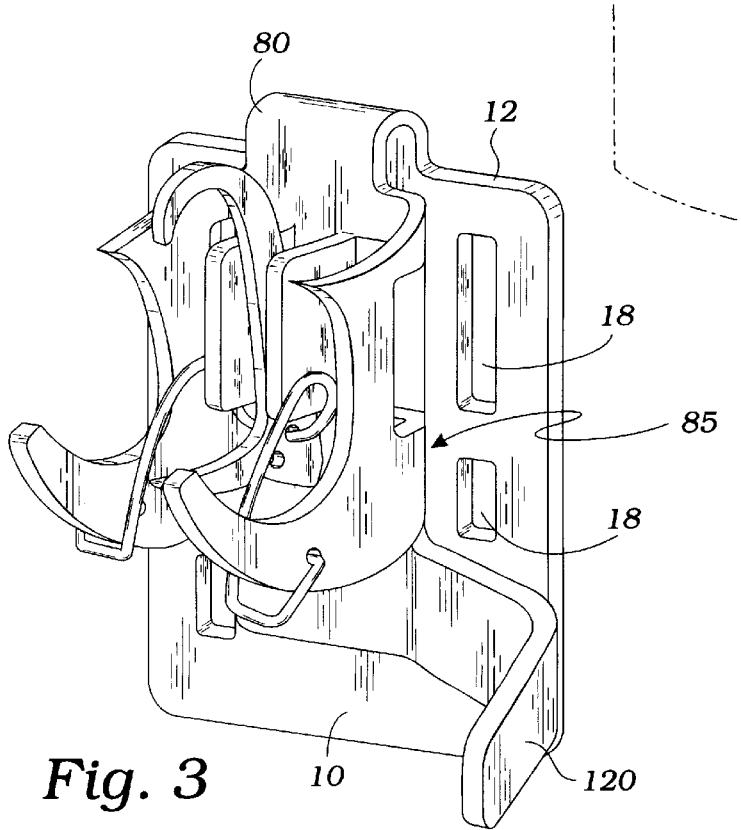
FIG. 3 is similar to FIG. 2 and further shows a trigger guard of the invention.
Figure 4:
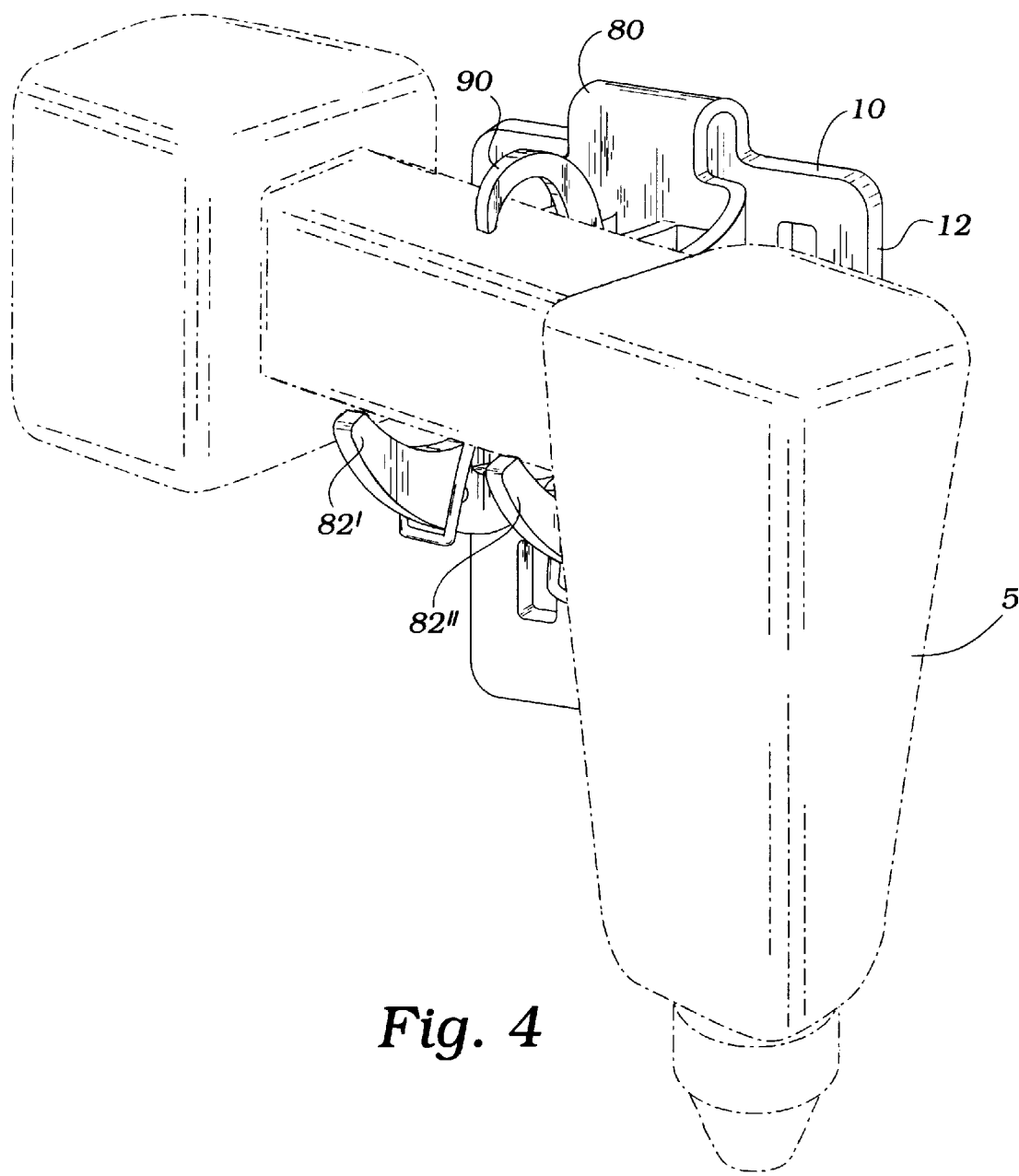
FIG. 4 is similar to FIG. 3 and further shows a hand tool in place.

Inventively, the cradling means 80 is integral to the base plate 10. A operating portion of the cradling means 80 is comprised of two upwardly shaped, and spaced apart, arms 82', 82" placed parallel to each other, for receiving a hand tool 5, such as an electric drill as shown in FIG. 4, and extending out perpendicularly from the base plate 10. Inventively, the apparatus also includes a tool clamping means 90, preferably comprised of a hard material such as a plastic formed in a C-shape and approximately centered between the upwardly shaped arms 82' and 82." A biasing means 100 is adapted, by its shape and attachment, for moving the tool clamping means 90 pivotally from a tool receiving position 130 to a tool clamping position 140, and for moving the tool clamping means 90 from the tool clamping position 140 to the tool receiving position 130. Inventively, the biasing means 100 is comprised of a dual rest position steel wire spring, anchored at its ends 132 to the upwardly shaped arms 82' and 82", and running through a hole 86 in the tool clamping means 90 and terminating in cradle holes 84. Before the tool 5 is placed in the cradling means 80, the spring forms two protrusions 102' and 102" within the space the tool 5 will occupy. When the tool 5 is placed in the cradling means 80, the spring protrusions 102' and 102" are forced downwardly and back toward the base plate 10, see FIG. 2.

Inventively, the tool clamping means 90 provides an actuating finger 110, which is the lower, curved portion of the C-shape of the tool clamping means 90. The actuating finger 110, when lifted, moves the tool clamping means 90 from the tool clamping position 140 to the tool receiving position 130 when the tool 5 is lifted from the cradling means 80.

In al alternate embodiment, the cradling means 80, tool clamping means 90 and biasing means 100 are adapted, by free pivotal engagement, with the base plate 10 so that they always maintain a preferred orientation with respect to the vertical. This is accomplished by providing a pivoting means such as a rivet for pivotally engaging the cradling means 80 to the base plate 10.

Inventively, a guard plate 120 extends outwardly from the lower portion 85 of the cradling means 80. The guard plate 120 is adapted by its size, shape and position for preventing inadvertent hand engagement with a tool trigger of the tool 5 when the tool 5 is lifted from the cradle 80.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:

a base plate having a means for mounting;

a cradling means adapted for receiving a hand tool;

a tool clamping means; and a biasing means adapted for moving the tool clamping means from a tool receiving position to a tool clamping position, and for moving the tool clamping means from the tool clamping position to the tool receiving position, the tool clamping means providing an actuating finger positioned for moving the clamping means from the tool clamping position to the tool receiving position when the tool is lifted from the cradle.

2. The apparatus of claim 1 wherein the cradling means, tool clamping means and biasing means are adapted, by free pivotal engagement with the base plate, for self-orientation so as to maintain the tool in a preferred fixed attitude relative to the vertical.

3. The apparatus of claim 1 further comprising a guard plate adapted and positioned to prevent inadvertent hand engagement with a trigger of the tool when the tool is lifted from the cradle.

4. The apparatus of claim 1 wherein the means for mounting is adapted for insertion into a pant pocket.

5. The apparatus of claim 1 wherein the means for mounting is adapted for receiving a belt for hanging the apparatus from the waist.

6. The apparatus of claim 1 wherein the base plate and the cradling means are integral.

7. The apparatus of claim 6 wherein the base plate and the cradling means are fabricated from a common plastic sheet stock.

* * * * *